United States Patent [19]
Vogt

[11] 3,744,308
[45] July 10, 1973

[54] ARRANGEMENT FOR SENSING DAMAGE TO THE EDGE PORTIONS OF A FILM

[75] Inventor: Horst Dieter Vogt, Zurich, Switzerland

[73] Assignee: CIBA-GEIGY AG, Basel, Switzerland

[22] Filed: Sept. 21, 1971

[21] Appl. No.: 182,354

[30] Foreign Application Priority Data
Sept. 24, 1970 Switzerland.................. 14135/70

[52] U.S. Cl.................................... 73/157, 73/159
[51] Int. Cl............................ G06k 7/04, G06k 7/10
[58] Field of Search............................ 73/157, 159; 250/219 FR, 223 R, 219 DC

[56] References Cited
UNITED STATES PATENTS

| | | | |
|---|---|---|---|
| 2,936,615 | 5/1960 | Braund | 73/157 |
| 2,617,593 | 11/1952 | Audier | 250/219 FR |
| 3,219,829 | 11/1965 | Reist | 250/223 R |
| 3,278,754 | 10/1966 | Wallace | 250/219 DC |

Primary Examiner—Richard C. Queisser
Assistant Examiner—Denis E. Corr
Attorney—Pierce, Scheffler & Parker

[57] ABSTRACT

A sensing arrangement for detecting edge cracks and perforation damage in a film being transported to a developing machine has a pair of pivotally-mounted, mechanical sensing elements spring-biased to act on opposite edges of the moving film. The pressures with which the sensing elements act on the film lie in the plane of the film. The sensing elements deflect in response to edge damage of the film and control a shutter in an infrared light path to provide a fault-indicative signal. To ensure that this signal does not cause the film transport mechanism to be stopped simply because no film is present, a film presence sensor is provided to provide a control signal to a gate through which the fault-indicative signal is transmitted.

5 Claims, 2 Drawing Figures

ARRANGEMENT FOR SENSING DAMAGE TO THE EDGE PORTIONS OF A FILM

This invention relates to an arrangement for sensing damage at at least one edge portion of a film. One use of this kind of sensing arrangement is in a film transport mechanism of a fully automatic or semi-automatic developing machine.

In the processing of exposed film in fully automatic or semi-automatic developing machines, strict care must be taken to ensure that any films having damaged edges, which includes cracked edges and/or damaged perforations, are removed before they enter the developing machine, since there is otherwise a risk of the films sticking and/or tearing off in the developing machine. This would result in machine stoppages and hence the destruction of practically all the films situated therein. It is a difficult matter to locate films which are cracked or have damaged perforations since the operation has to be carried out in complete darkness, the films usually being conveyed at relatively high speeds of the order of some metres per second.

It has been proposed to check films for damage of the above kind by photoelectric scanning but photoelectric scanning devices are relatively expensive and are of only limited use for examining film perforations, since care must be taken to ensure that the individual perforations are not detected as cracks.

The present invention is concerned with a mechanical film sensing arrangement. In one previously proposed mechanical sensing system, the sensors contact the film surface. To do sensing in this manner increases the risk of damage to the film surface, while in addition perforation damage is not detectable.

The present invention adopts a different approach to the problem of mechanical sensing and in one aspect provides in or for use in a film transport mechanism defining a film transport path along which a film is moved lengthwise, an arrangement for sensing damage at an edge portion of a film, the arrangement comprising a mechanical sensing element, means biasing said element to bear against one edge of said film with the bearing pressure acting substantially in the plane of said film as the latter is transported past said sensing element, said element being mounted for deflection in response to damage sensed thereby, and means operable in response to such deflection of said element to provide a fault-indicative signal.

In a preferred form for sensing both edges of a film simultaneously the invention provides in or for use in a film transport mechanism defining a film transport path along which a film is moved lengthwise, an arrangement for sensing damage to the edge portions of a film, the arrangement comprising a pair of mechanical sensing elements disposed on opposite sides of said film transport path; means biasing said elements to bear against opposite edges of a film transported along said path with the bearing pressures acting substantially in the plane of said film, each of said elements being mounted for deflection in response to damage sensed thereby, and means operable in response to such deflection of one or other of said elements to provide a fault-indicative signal.

In order that the invention and the manner of putting it into practice may be better understood, a preferred embodiment of a sensing arrangement of the invention will now be described with reference to the drawing in which.

Figure 1:
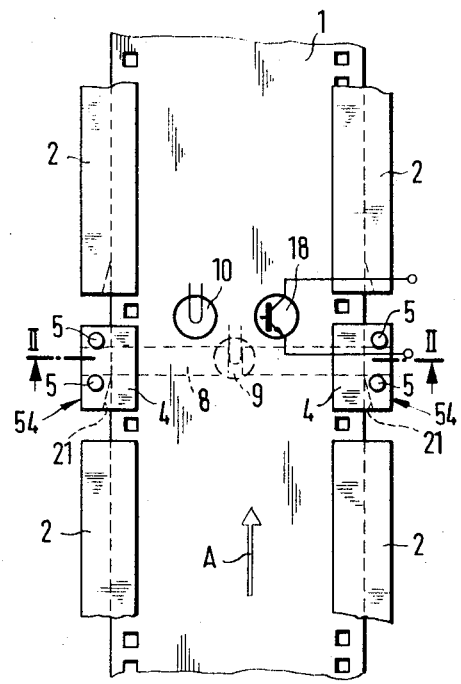
FIG. 1 is a diagrammatic plan view of the sensing arrangement.

In the figures interconnections between electrical components of the arrangement are shown in schematic diagram form.

Referring to the drawing, an exposed film 1 for developing is transported by a conventional transport mechanism (not shown) along a path extending in the direction of the arrow A. At a point along the path the edge portions of the film are monitored to detect cracked edges and damaged perforations. The edges of the film are sensed by mechanical sensing elements described below which are on opposite lateral sides of the transport path and which are flanked on each longitudinal side by fixed guide members 2. The members 2 are in pairs having facing grooves through which opposite edges of the film pass.

Between the pairs of guides 2 each of the two film edges is contacted by a respective sensing element 54. Each sensing element comprises a film contacting member 4 mounted at one end of a pivotally mounted arm which in this embodiment is constituted by a pair of parallel rods 5 pivotally mounted at their ends remote from member 4 in any suitable manner as indicated at 6 in FIG. 2. Each sensing element 54 is deflectable about the pivot 6 in a plane perpendicular to the plane of the film as carried along the transport path which extends between the sensing elements. Furthermore the sensing elements 54 are themselves mounted to act along an axis perpendicular to the film transport direction A so that the elements in fact pivot in a common plane. The film contact members 4 are grooved and the respective edges of film pass through the grooves as illustrated in the figures. The sensor members 4 are biased to bear against the edge of the film 1 by a tension spring 7 connected between the arms 5,5 of the sensing elements 54. The arms 5,5 are substantially perpendicular to the plane of film 1 and the arrangement is such that the bearing pressure applied to the film is substantially in the plane of the film. The sensing elements 54 will thus sense damage to the edge portions of the film 1 by one or other element deflecting inwardly under the bias of spring 7. The sensing arrangement further comprises means responsive to such a deflection of a sensing element to provide a fault-indicative signal. This means will now be described.

A small opaque plate 8 is secured to each arm 5,5. The two plates 8 constitute a normally open shutter located in the light path between a light source 9 and a phototransistor 14 or the like. The light path includes lenses 12 and 13 for appropriately focusing the light. The light source used is not screened from film 1 and in this circumstance the source 9 is an infrared light source which emits light of a wavelength to which the film is insensitive. The plates 8 deflect with the sensing elements to vary the shutter opening. The length of the film contacting members 4 in the film transport direction, the tensile force of the spring 7 and the respective positions of the plates 8 are so adjusted that the latter interrupt the light path 9, 12, 13, 14 only if the damage exceeds a predetermined minimum size. This minimum size is so adjusted to the needs of the developing machine (not shown) that any damage below said minimum size will not result in any malfunction in the developing machine. The pivotal movement of the arms 5,5 and hence of the sensing elements 54 is limited by stops 11 to avoid any damage to the film by the sensing elements themselves.

The distances between the film guides 2 - 4 - 2 are only a few millimetres, preferably about 2 – 3 millimetres. If the sensing elements do not have guiding film contacting members 4, the distance between the fixed film guides 2 should have the minimum possible dimensions and should not exceed 4 – 6 mm.. This is important to proper functioning of the described arrangement since otherwise there is a danger that the sensing elements will cause excessive deformation of undamaged film lengths or the film edges, and then respond to the damage they have caused. This would of course make reliable detection of film damage impossible and increase the risk of damaged film reaching the developing machine.

As soon as the light path 9, 12, 13, 14 is interrupted by a sufficient rocking movement of one or both of the sensing elements 54, the phototransistor 14 provides a fault-indicative signal which is passed by a gate 19 to trigger an output stage 15 which provides an alarm signal and/or stops the film transport mechanism. The gate 19 is provided to prevent the fault-indicative signal being passed to stage 15 when no film is present along the path past the sensing elements 54.

To sense the presence of a film along the transport path an infrared reflected light system is disposed above the film path and immediately after the sensing elements 54 with respect to the direction A of film transport. This system comprises an infrared light source 10, two lenses 16 and 17, and a phototransistor 18. Source 10 and phototransistor 18 are disposed so that the latter receives light from the source by reflection from a film 1 present in the transport path. In the absence of the film the phototransistor receives no light. The signal output of transistor 18 is connected to gate 19. For convenience the infrared light system 9, 12, 13, 14 will hereinafter be referred to as the first, and the infrared light system 10, 16, 17, 18 as the second light system.

Figure 2:
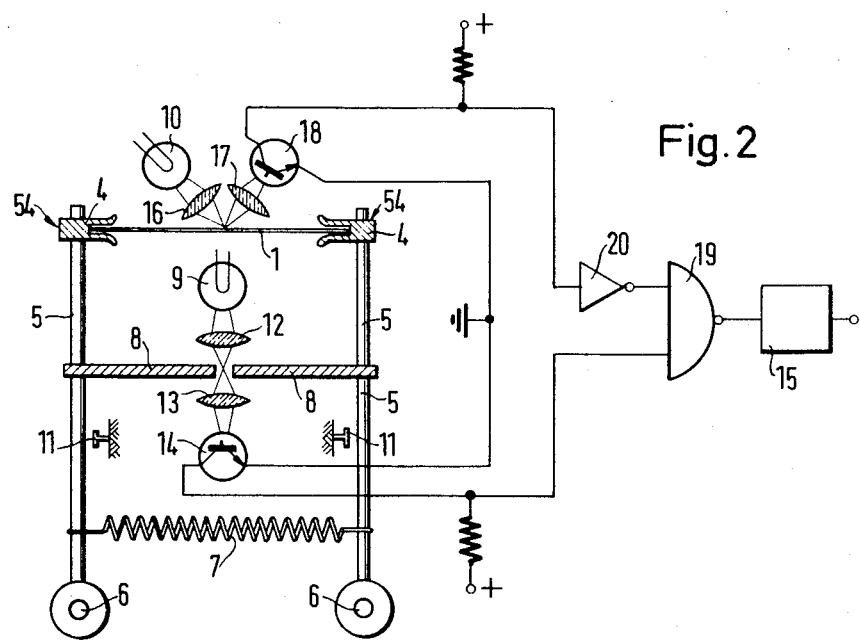
FIG. 2 is a section on the line II — II in FIG. 1.

The emitters of the two phototransistors 14 and 18 of the first and second light systems are interconnected and earthed as shown in FIG. 2. The collector of the phototransistor 14 is connected to one input of gate 19 which is a NAND gate and the output of which is connected to the stage 15. The collector of the phototransistor 18 is connected to the other input of the NAND gate 19 via an inverter 20. If the second light system does not detect the presence of a film, a logic signal, which we will call level "1," occurs at the input of the inverter 20 and a logic signal "0" at the corresponding input of the NAND gate. At the same time, the second light system which is in the fault-indicative condition delivers a signal "1" to the input of the NAND gate so that a signal "1" passes to stage 15. If the second light system detects the presence of a film, a signal "0" occurs at the input to the inverter 20 and the signal "1" occurs at the corresponding input of the NAND gate. If the sensing elements 54 do not perform a rocking movement such as to interrupt the ligh path of the first light system, the latter delivers a signal "0" to the corresponding input of the NAND gate 19, so that a signal "1" also passes to the stage 15. If, however, a crack or damage to the film perforation causes the sensing elements 54 to perform a rocking movement such as to interrupt the first light system path, the latter delivers a signal "1" to the input of the NAND gate 19, so that a signal "0" is transmitted to the stage 15. As soon as the input of stage 15 receives a signal "0" — i.e. only when the first light system provides a signal indicating an edge crack or perforation damage and the second light system detects the presence of a film, — then stage 15 triggers an alarm signal and/or stops the film transport.

In the embodiment illustrated, the film guide members 4 of the sensing elements 54 (and preferably also the fixed film guides 2) have surfaces 21 (FIG. 1) at the film entry side which are bevelled on both sides in the direction of transport. The sensing elements 54 are therefore automatically pressed apart by an incoming film leader. This is possible because the arms 5,5 of the sensing elements 54 bear against the stops 11 and the arrangement is so adjusted that in these conditions the film can enter the members 4.

The second light system 10, 16, 17, 18 could also be disposed after the sensors 54 with respect to the direction of film transport and be coupled to a mechanism which momentarily moves the two sensing elements 54 apart against the force of the spring 7 as soon as a film leader runs against the sensors. A microswitch or the like may be used instead of the second light system to sense the presence of a film.

The sensing elements have been described as mounted for pivotal deflection. They could be mounted and biased for linear deflection if desired.

I claim:

1. In or for use in a film transport system defining a film transport path along which a film is moved lengthwise, an arrangement for sensing the presence of and any damage to at least one edge portion of the film which comprises means disposed to sense the presence of a film along said transport path and to provide a signal indicating the presence of said film, at least one mechanical film-damage sensing element, means biasing said film-damage sensing element to bear against an edge of said film with the bearing pressure acting substantially in the plane of said film as the film is transported past said sensing element, said sensing element being mounted for deflection in response to damage sensed thereby, means operable in response to such deflection of said sensing element to provide a fault-indicative signal, and means responsive to said fault-indicative signal and to said film presence signal to provide an output in response to said fault-indicative signal only if said film-presence signal is simultaneously present.

2. A film sensing arrangement as defined in claim 1 wherein said fault-indicative signal means comprises a light source, a photoelectric device responsive to light from said source, and a shutter movable in response to deflection of said film-damage sensing element to control the passage of light from said light source to said photoelectric device.

3. A film sensing arrangement as defined in claim 1 wherein said film presence sensing means includes a source of infrared radiation arranged to direct such radiation at said film transport path and means disposed to receive reflected radiation from a film transported along said path and to provide said film presence signal in response to the receipt of said reflected radiation.

4. A film sensing arrangement as defined in claim 1 wherein two mechanical film-damage sensing elements are provided and which are located respectively on opposite sides of said film transport path and are biased to bear against opposite edges of the film.

5. A film sensing arrangement as defined in claim 1 wherein two mechanical film-damage sensing elements are provided and which are located respectively on opposite sides of said film transport path, each of said film-damage sensing elements including an arm pivotally mounted at one end for deflection in a plane perpendicular to the plane of said film transported therepast, wherein said biasing means for said film-damage sensing elements comprises a tension spring acting between the two pivotally mounted arms, and wherein said fault-indicative signal means comprises a light source, a photoelectric device disposed to receive light from said source and a shutter disposed therebetween to control the light passed to said photoelectric device, said shutter comprising a pair of opaque members mounted on respective ones of said film-damage sensing arms to be deflected therewith and provide an opening for the passage of light to said photoelectric element variable in accordance with the deflection of said film-damage sensing arms.

* * * * *